United States Patent
Wang et al.

(10) Patent No.: US 11,665,596 B2
(45) Date of Patent: May 30, 2023

(54) PLANNING OF FIXED WIRELESS INTERNET

(71) Applicant: AT&T Intellectual Property I, L.P., Atlanta, GA (US)

(72) Inventors: Huahui Wang, Bridgewater, NJ (US); Yuning Yang, Basking Ridge, NJ (US); Ye Ge, Holmdel, NJ (US); Wenjie Zhao, Princeton, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 4 days.

(21) Appl. No.: 17/410,721

(22) Filed: Aug. 24, 2021

(65) Prior Publication Data
US 2023/0064719 A1 Mar. 2, 2023

(51) Int. Cl.
| | |
|---|---|
| H04W 28/20 | (2009.01) |
| H04W 72/08 | (2009.01) |
| H04W 24/02 | (2009.01) |
| H04W 16/18 | (2009.01) |
| H04W 16/10 | (2009.01) |

(52) U.S. Cl.
CPC .......... *H04W 28/20* (2013.01); *H04W 16/10* (2013.01); *H04W 16/18* (2013.01); *H04W 24/02* (2013.01); *H04W 72/082* (2013.01)

(58) Field of Classification Search
CPC ... H04W 28/20; H04W 72/082; H04W 24/02; H04W 16/18; H04W 16/10; H04W 72/04; H04W 88/08; H04W 76/00
See application file for complete search history.

(56) References Cited

U.S. PATENT DOCUMENTS

| | | | |
|---|---|---|---|
| 10,630,410 B2* | 4/2020 | Parkvall | H04L 5/0053 |
| 2008/0080631 A1* | 4/2008 | Forenza | H04L 25/03343 |
| | | | 375/260 |
| 2010/0124930 A1* | 5/2010 | Andrews | H04W 36/04 |
| | | | 455/447 |
| 2012/0076028 A1* | 3/2012 | Ko | H04B 7/0417 |
| | | | 370/252 |
| 2013/0182789 A1* | 7/2013 | Ko | H04B 7/0486 |
| | | | 375/267 |

(Continued)

Primary Examiner — Hassan A Phillips
Assistant Examiner — Prenell P Jones
(74) Attorney, Agent, or Firm — Amin, Turocy & Watson, LLP

(57) ABSTRACT

Intelligent, automated, fixed wireless internet planning (e.g., using a computerized tool) is enabled. For instance, a system can comprise a processor and a memory that stores executable instructions that, when executed by the processor, facilitate performance of operations, comprising: determining, for a user equipment determined to be within a defined coverage area, a signal to interference and noise ratio, based on the signal to interference and noise ratio, determining a spectral efficiency value corresponding to the user equipment, based on the spectral efficiency value and a total available bandwidth of a network via which the defined coverage area is enabled, determining an available throughput corresponding to the user equipment, and in response to a determination that the available throughput exceeds a threshold throughput, designating the user equipment, in a data store, as being covered within the defined coverage area by the total available bandwidth of the network.

20 Claims, 13 Drawing Sheets

(56) References Cited

U.S. PATENT DOCUMENTS

| | | | | |
|---|---|---|---|---|
| 2013/0229941 A1* | 9/2013 | Huang | H04W 72/08 |
| | | | 370/252 |
| 2014/0071967 A1* | 3/2014 | Velasco | H04L 12/1403 |
| | | | 370/338 |
| 2014/0073288 A1* | 3/2014 | Velasco | H04W 4/02 |
| | | | 455/411 |
| 2014/0073289 A1* | 3/2014 | Velasco | H04W 12/04 |
| | | | 455/411 |
| 2014/0161056 A1* | 6/2014 | Moulsley | H04W 72/042 |
| | | | 370/329 |
| 2015/0288593 A1* | 10/2015 | Campbell | H04L 65/762 |
| | | | 709/224 |
| 2016/0135087 A1* | 5/2016 | Xu | H04W 36/30 |
| | | | 455/436 |
| 2017/0215195 A1* | 7/2017 | Chamorro | H04W 72/0453 |
| 2020/0396723 A1* | 12/2020 | Yang | H04W 4/70 |
| 2021/0266762 A1* | 8/2021 | Stawiarski | H04W 24/08 |
| 2022/0014963 A1* | 1/2022 | Yeh | G06N 3/0445 |
| 2022/0124731 A1* | 4/2022 | Bontu | H04W 72/046 |
| 2022/0279535 A1* | 9/2022 | Tsui | H04L 5/005 |

* cited by examiner

PLANNING OF FIXED WIRELESS INTERNET

TECHNICAL FIELD

The disclosed subject matter relates to wireless networks and, more particularly, to automated planning of fixed wireless internet (FWI), e.g., over fourth generation (4G), fifth generation (5G), and/or sixth generation (6G) wireless networks.

BACKGROUND

Infrastructure investments costs for cable and fiber installations often prevent the expansion of those internet services to less populated areas. For instance, many rural areas still do not have access to cable or fiber high speed internet. Fixed Wireless Internet (FWI) provides an alternative solution by connecting those users to the Internet. FWI uses existing cellular infrastructures to provide services. Compared with the cable and satellite internet services, FWI has the advantages like high flexibility, low latency, and high reliability. FWI can also avoid the infrastructure investment needed for cable or fiber-based internet. Some challenges of FWI reside in the wireless nature of the radio waves. Quality of service could be degraded if the signal strength is weak, interference is high, or when the available resource for the FWI customers is reduced from competition from other user equipment. To guarantee quality of service, a wireless network must be planned before providing services to customers. Additionally, mobility/wireless user experiences should not be disrupted by the addition of FWI equipment. When necessary, network upgrade or augmentation is needed to improve coverage and capacity.

Traditional methods for determining a network's ability to serve FWI users under specific coverage and capacity requirements heavily depend on link budget analysis and high level regression models for such studies. These traditional methods do not capture the detailed aspects of the wireless networks. The accuracy of such methods is not sufficient for the point-to-point communication for FWI.

The above-described background relating to fixed wireless internet is merely intended to provide a contextual overview of some current issues and is not intended to be exhaustive. Other contextual information may become further apparent upon review of the following detailed description.

DETAILED DESCRIPTION

Figure 1:
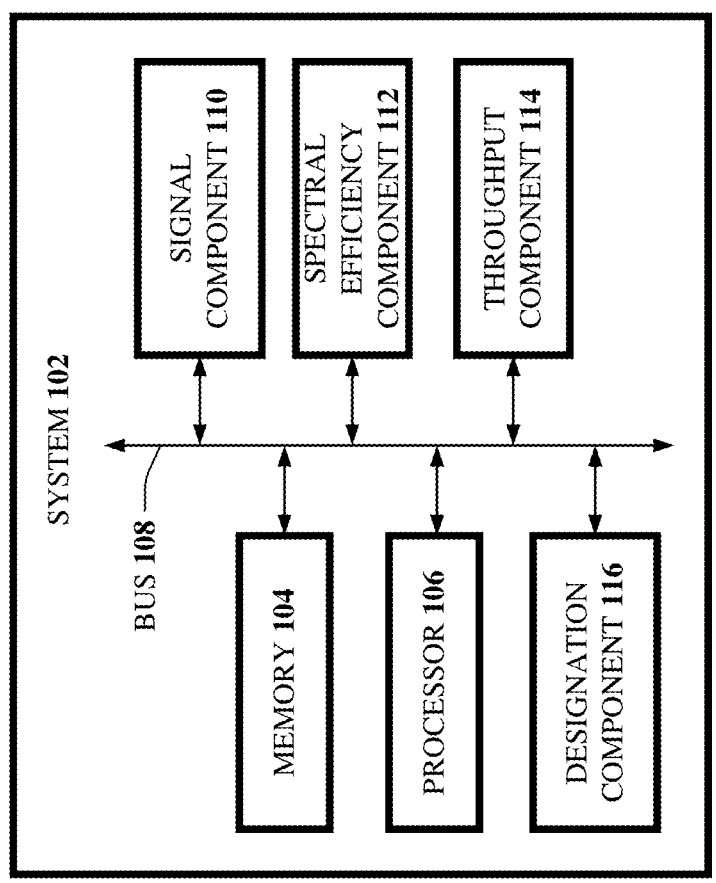
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, fixed wireless internet (FWI) planning can be improved in various ways, and various embodiments are described herein to this end and/or other ends.

According to an embodiment, a system can comprise: a processor, and a memory that stores executable instructions that, when executed by the processor, facilitate performance of operations, comprising: determining, for a user equipment determined to be within a defined coverage area, a signal to interference and noise ratio (SINR), based on the SINR, determining a spectral efficiency value corresponding to the user equipment, based on the spectral efficiency value and a total available bandwidth of a network via which the defined coverage area is enabled, determining an available throughput corresponding to the user equipment, and in response to a determination that the available throughput exceeds a threshold throughput, designating the user equipment, in a data store, as being covered within the defined coverage area by the total available bandwidth of the network.

In various embodiments, the above operations can further comprise: determining carrier aggregation information representative of a compatibility of carrier aggregation for a pairing of the user equipment and a serving cell of the defined coverage area, wherein determining the available throughput is further based on the carrier aggregation information.

In one or more embodiments, determining the signal to interference and noise ratio comprises determining a reference signal received power (RSRP) associated with the user equipment and the defined coverage area.

In additional embodiments, the user equipment can be a first user equipment and the available throughput can comprise a first maximum throughput. In this regard, the above operations can further comprise: ranking a group of user equipment according to respective maximum throughputs, wherein the group of user equipment comprises the first user equipment, and in response to a determination that a second user equipment of the group of user equipment comprises a second maximum throughput, larger than the first maximum throughput, designating the second user equipment as comprising a higher rank than the first user equipment.

In some embodiments, the above operations can further comprise: in response to estimated data traffic of a quantity of user equipment of the group of user equipment being determined to exceed a threshold capacity of the network, disqualifying at least one of the group of user equipment in an order of increasing rank until the threshold capacity of the network is no longer exceeded, and wherein the first user equipment is disqualified before the second user equipment.

In one or more embodiments, the above operations can further comprise: in response to estimated data traffic associated with the user equipment being determined not to exceed a threshold capacity of the network, further designating, in the data store, the user equipment as satisfying a capacity requirement associated with the network.

It is noted that the spectral efficiency value can be further determined based on a multiple-input and multiple-output (MIMO) configuration setting of the network. Additionally, the user equipment can comprise FWI user equipment.

According to another embodiment, a method can comprise: based on a usable transmit power of a user equipment and an uplink path loss from the user equipment to a serving cell, determining, by network equipment comprising a processor, a usable quantity of physical resource blocks, usable via a network, employable for use with an uplink transmission from the user equipment, wherein the network comprises the serving cell and the network equipment, based on the usable quantity of physical resource blocks and an uplink SINR, determining, by the network equipment, a spectral efficiency value corresponding to the uplink transmission, based on the spectral efficiency value and the usable quantity of physical resource blocks, determining, by the network equipment, a usable throughput applicable to the network, and in response to a determination that the usable throughput exceeds a threshold throughput, categorizing, by the network equipment, the user equipment as being covered for network services via the network.

In various embodiments, the method can further comprise: determining, by the network equipment, carrier aggregation information representative of a compatibility of carrier aggregation for a pairing of the user equipment and the serving cell of the network, wherein determining the usable throughput is further based on the carrier aggregation information.

In one or more embodiments, the user equipment can comprise a first user equipment and the usable throughput can comprise a first maximum throughput. In this regard, the above method can further comprise: ranking, by the network equipment, a group of user equipment according to respective maximum throughputs, wherein the group of user equipment comprises the first user equipment, the ranking comprising, in response to a determination that a second user equipment of the group of user equipment comprises a second maximum throughput, larger than the first maximum throughput, categorizing the second user equipment as comprising a higher rank than the first user equipment. In various embodiments, the above method can further comprise: in response to data flows of a quantity of user equipment of the group of user equipment being determined, by the network equipment, to exceed a threshold capacity of the network, disqualifying, by the network equipment, at least one of the group of user equipment in an order of increasing respective rank until the threshold capacity of the network is no longer exceeded, wherein the first user equipment is disqualified before the second user equipment. In other embodiments, the above method can further comprise: in response to a quantity of user equipment of the group of user equipment being determined not to exceed a threshold capacity of the network, further categorizing, by the network equipment, the user equipment as satisfying a capacity requirement associated with the network, wherein the quantity of user equipment comprises the user equipment.

In some embodiments, the user equipment can comprise fixed wireless user equipment. In this regard, the fixed wireless user equipment can be assigned to be of a lower priority, of respective equipment priorities, than mobile wireless user equipment communicatively coupled to the network.

In yet another embodiment, a non-transitory machine-readable medium can comprise executable instructions that, when executed by a processor, facilitate performance of operations, comprising: determining, for a user equipment, of a group of user equipment, determined to be located within a defined coverage area, a downlink signal to interference and noise ratio, based on the downlink signal to interference and noise ratio, determining a downlink spectral efficiency value corresponding to a downlink transmission to the user equipment, based on the downlink spectral efficiency value and a total available bandwidth of a network via which the defined coverage area is enabled, determining a maximum downlink throughput corresponding to the user equipment, based on a usable transmit power of a user equipment and an uplink path loss from the user equipment to a serving cell that is part of a network, determining a usable quantity of physical resource blocks, of the network, employable for use with an uplink transmission from the user equipment, based on the usable quantity of physical resource blocks and an uplink signal to interference and noise ratio, determining an uplink spectral efficiency value corresponding to an uplink transmission from the user equipment, based on the uplink spectral efficiency value and the usable quantity of physical resource blocks, determining a limit on uplink throughput applicable to the user equipment, in response to a determination that the limit on uplink throughput exceeds an uplink threshold throughput and that the limit on downlink throughput exceeds a downlink threshold throughput, generating first information that identifies the user equipment as being covered for network services via the network, and ranking the group of user equipment according to respective limits on downlink throughputs and respective limits on uplink throughputs.

In various embodiments, the above operations can further comprise: determining an estimated resource utilization associated with the user equipment and an available capacity associated with the network, and in response to a determination that the estimated resource utilization associated with the user equipment does not exceed the available capacity associated with the network, generating second information that identifies the user equipment as operable with the network. It is noted that the above operations can further comprise: in response to a quantity of user equipment of the group of user equipment being determined to exceed the available capacity of the network, disqualifying at least one of the group of user equipment in a ranked order until the available capacity of the network is no longer exceeded. In various embodiments, generating the second information that identifies the group of user equipment as operable with the network can comprise generating the second information in further response to the group of user equipment being determined not to exceed the available capacity of the network.

It is noted that, in some embodiments, the group of user equipment comprises fixed wireless user equipment and mobile wireless user equipment.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to FWI planning. The system 102 can comprise one or more of a variety of components, such as memory 104, processor 106, bus 108, signal component 110, spectral efficiency component 112, throughput component 114, and/or designation component 116.

In various embodiments, one or more of the memory 104, processor 106, bus 108, signal component 110, spectral efficiency component 112, throughput component 114, and/or designation component 116 can be communicatively or operably coupled (e.g., over a bus or wireless network) to one another to perform one or more functions of the system 102.

Downlink (DL) Coverage Analysis: According to an embodiment, the signal component 110 can determine, for a user equipment (e.g., user equipment 604 as later discussed in greater detail) determined to be within a defined coverage area (e.g., coverage area 610 as later discussed in greater detail), a SINR value. In various embodiments, determining the SINR can comprise determining (e.g., using the signal component 110) an RSRP value associated with the user equipment and the defined coverage area. It is noted that the user equipment can comprise FWI user equipment. It is further noted that fixed wireless user equipment herein can be assigned to be of a lower priority, of respective equipment priorities, than mobile wireless user equipment communicatively coupled to the network.

RSRP values herein can be determined according to the following:

$$RSRP = P_{tx} - \text{LinkLoss} \quad \text{Equation (1)}$$

In this regard:
$P_{tx}$ can represent transmit power (e.g., in dB); and
LinkLoss can represent signal loss between cell and bin (e.g., in dB), including antenna gains and propagation attention and other losses.

SINR values herein can be determined according to the following:

$$SINR = \frac{S}{I+N} = \frac{S}{\sum_k Q_k I_k + N} \quad \text{Equation (2)}$$

In this regard:
S can represent signal power;
N can represent thermal noise;
Q can represent system loading (e.g., PRB utilization); and
I can represent interference power.

According to an embodiment, the spectral efficiency component 112 can, based on the signal to interference and noise ratio, determine a spectral efficiency value corresponding to the user equipment. In this regard, calculated SINR values (e.g., after unit conversion to dB) can be converted to spectral efficiency (e.g., using empirical mapping curves/tables—see, e.g., FIG. 7). In various embodiments, the spectral efficiency value can be further determined (e.g., via the spectral efficiency component 112) based on a MIMO configuration setting of the network.

According to an embodiment, the throughput component 114 can, based on the spectral efficiency value and a total available bandwidth of a network via which the defined coverage area is enabled, determine an available throughput corresponding to the user equipment.

DL throughput values can be determined according to the following:

$$\text{Tput}_{DL_i} = SE_i * \text{Max}_{PRB_i} \quad \text{Equation (3)}$$

In this regard:
i can represent a cell; and
$\text{Max}_{PRB_i}$ can represent a maximum quantity of PRBs available for downlink transmission for cell i.

According to an embodiment, the designation component 116 can, in response to a determination that the available throughput exceeds a threshold throughput, designate the user equipment (e.g., in a data store such as a memory 104) as being covered within the defined coverage area by the total available bandwidth of the network.

Uplink (UL) Coverage Analysis: In another embodiment, the signal component 110 can, based on a usable transmit power of a user equipment and an uplink path loss from the user equipment to a serving cell, determine a usable quantity of PRBs, usable via a network, employable for use with an uplink transmission from the user equipment. In this regard, the network can comprise the serving cell and the network equipment.

A useable quantity (e.g., maximum quantity) of PRBs can be determined according to the following:

$$N_{PRB_{Max}} = \text{scale factor} * \min\left(N_{PRB_{All}} - N_{PUCCH}, \text{ceil}\left(10^{\frac{P_{max} - P_{tx_{UL}}}{10}}\right)\right) \quad \text{Equation (4)}$$

In this regard:
$\text{MAX}_{PRBUL}$ is the total PRBs available for the uplink transmission;
N_PUCCH is the number of PRBs used for the PUCCH (Physical Uplink Control Channel); and
Scale factor is set to 1 for FDD (Frequency Division Duplex) systems, and is set to a value less than 1 for TDD (Time Division Duplex) systems According to an embodiment, the spectral efficiency component 112 can, based on the usable quantity of PRBs and an uplink SINR, determine a spectral efficiency value corresponding to the uplink transmission (see, e.g., FIG. 7)

According to an embodiment, the throughput component 114 can, based on the spectral efficiency value and the usable quantity of PRBs, determine a usable throughput applicable to the network.

UL throughput values can be determined according to the following:

$$\text{Tput}_{UL_i} = SE_{UL_i} * N\text{Max}_{PRB_i} \quad \text{Equation (5)}$$

In this regard:
i can represent a cell; and
$\text{Max}_{PRB_i}$ can represent a maximum quantity of PRBs available for uplink transmission for cell i.

According to an embodiment, the designation component 116 can, in response to a determination that the usable throughput exceeds a threshold throughput, categorize the user equipment as being covered for network services via the network. In this regard, if speed is higher than the required upload speed (e.g., Y Mbps), the user equipment can be determined to be uplink covered by the network. Further in this regard, uplink throughput can be determined according to the following:

$$\text{Tput}_{UL} = \max(\text{Tput}_{UL_i}) \text{ among all cells } i \qquad \text{Equation (6)}$$

Figure 2:
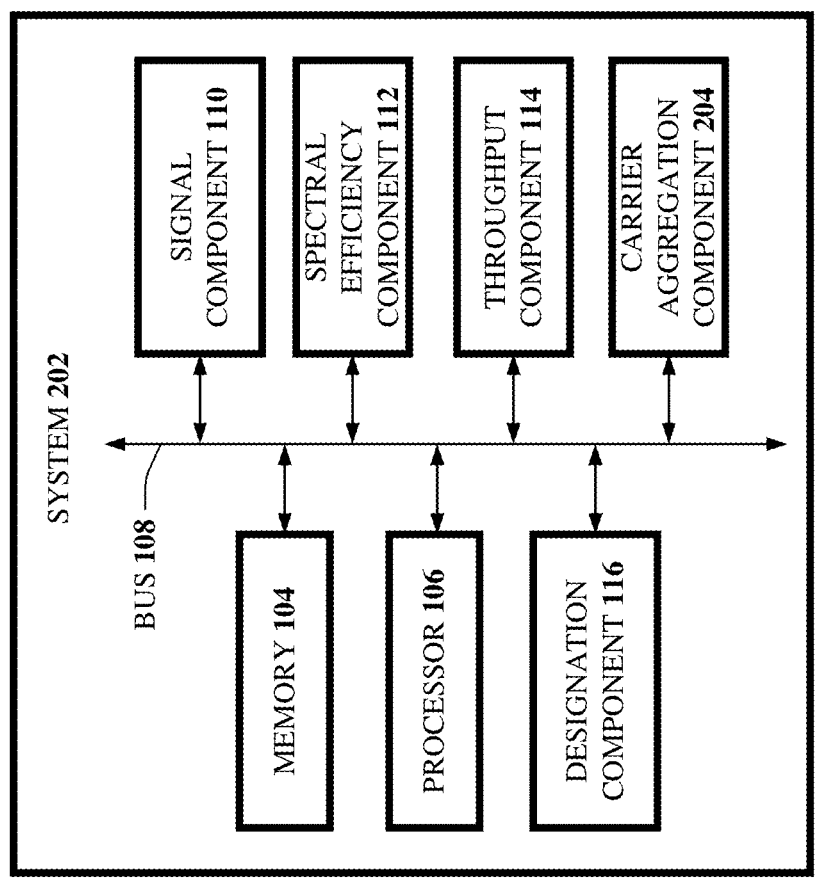
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to FWI planning. The system 202 can be similar to system 102, and can comprise one or more of a variety of components, such as memory 104, processor 106, bus 108, signal component 110, spectral efficiency component 112, throughput component 114, and/or designation component 116. The system 202 can additionally comprise a carrier aggregation component 204.

In various embodiments, one or more of the memory 104, processor 106, bus 108, signal component 110, spectral efficiency component 112, throughput component 114, designation component 116, and/or carrier aggregation component 204 can be communicatively or operably coupled (e.g., over a bus or wireless network) to one another to perform one or more functions of the system 202.

DL Coverage Analysis:

According to an embodiment, the carrier aggregation component 204 can determine carrier aggregation information representative of a compatibility of carrier aggregation for a pairing of the user equipment (e.g., UE 604) and a serving cell (e.g., serving cell 602) of the defined coverage area. In this regard, determining the available throughput can be further based on the carrier aggregation information. If carrier aggregation is permitted among a group of N cells, the throughput values on these N cells can be summed to determine the final speed for a specific user. In this regard, DL throughput values can be determined according to the following:

$$\text{Tput}_{max} = \Sigma \text{Tput}_i \qquad \text{Equation (7)}$$

for i in the group of N cells capable of performing carrier aggregation.

UL Coverage Analysis:

According to an embodiment, the carrier aggregation component 204 can determine carrier aggregation information representative of a compatibility of carrier aggregation for a pairing of the user equipment and the serving cell of the network. In this regard, determining the usable UL throughput can be further based on the carrier aggregation information. In this regard, for each user equipment, carriers can be ranked by the following metric:

$$r = \frac{\text{efficiency}}{T \times \text{power per } PRB} \qquad \text{Equation (8)}$$

The carrier (e.g., frequency) with the largest r value can be evaluated first in order to determine if power headroom is larger than zero. If power headroom is not larger than zero, carrier aggregation is not permitted. If power headroom is larger than zero, the carrier (e.g., frequency) with second largest r value can be selected. The maximum number of PRBs that can be used for UL transmission can be determined. In this regard, available power for UL transmission can comprise the power headroom from the first carrier (e.g., first frequency).

Figure 3:
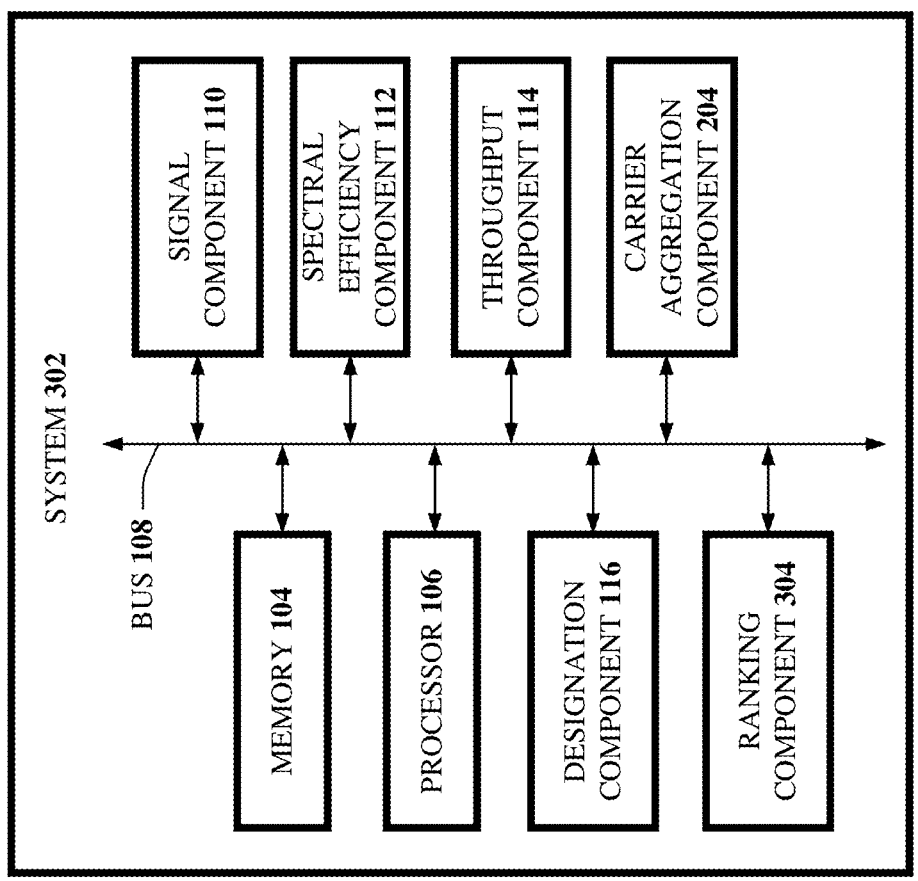
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to FWI planning. The system 302 can be similar to system 202, and can comprise one or more of a variety of components, such as memory 104, processor 106, bus 108, signal component 110, spectral efficiency component 112, throughput component 114, designation component 116, and/or carrier aggregation component 204. The system 302 can additionally comprise a ranking component 304.

In various embodiments, one or more of the memory 104, processor 106, bus 108, signal component 110, spectral efficiency component 112, throughput component 114, designation component 116, carrier aggregation component 204, and/or ranking component 304 can be communicatively or operably coupled (e.g., over a bus or wireless network) to one another to perform one or more functions of the system 302.

DL Coverage Analysis:

According to an embodiment, the ranking component 304 can rank a group of user equipment according to respective maximum throughputs. In this regard, the group of user equipment can comprise the first user equipment.

UL Coverage Analysis:

According to an embodiment, the ranking component 304 can rank group of user equipment according to respective maximum throughputs. In this regard, the group of user equipment can comprise the first user equipment. Further in this regard, in response to a determination that a second user equipment of the group of user equipment comprises a second maximum throughput, larger than the first maximum throughput, the designation component 116 can categorize the second user equipment as comprising a higher rank than the first user equipment.

Figure 4:
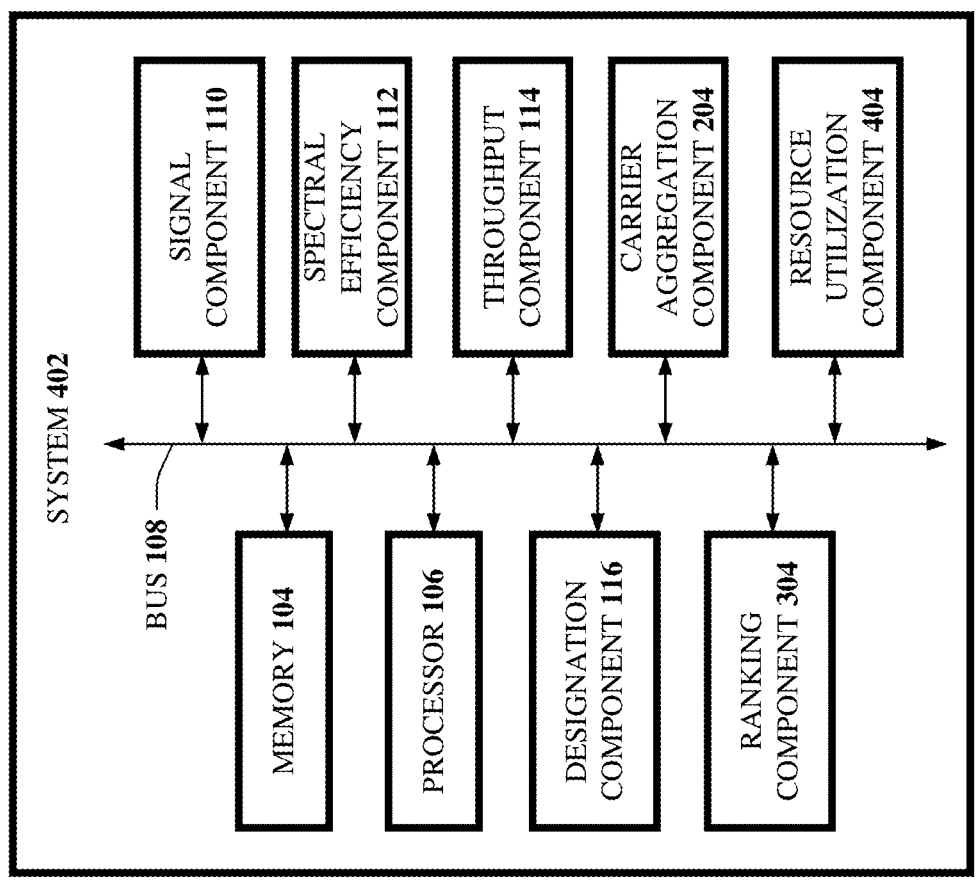
FIG. 4 is a block diagram of an exemplary system in accordance with one or more embodiments described herein.

Turning now to FIG. 4, there is illustrated an example, non-limiting system 402 in accordance with one or more embodiments herein. System 402 can comprise a computerized tool, which can be configured to perform various operations relating to FWI planning. The system 402 can be similar to system 302, and can comprise one or more of a variety of components, such as memory 104, processor 106, bus 108, signal component 110, spectral efficiency component 112, throughput component 114, designation component 116, carrier aggregation component 204, and/or ranking component 304. The system 402 can additionally comprise a resource utilization component 404.

In various embodiments, one or more of the memory 104, processor 106, bus 108, signal component 110, spectral efficiency component 112, throughput component 114, designation component 116, carrier aggregation component 204, ranking component 304, and/or resource utilization component 404 can be communicatively or operably coupled (e.g., over a bus or wireless network) to one another to perform one or more functions of the system 402.

Capacity Analysis:

According to an embodiment, the resource utilization component 404 can determine an estimated resource utilization associated with the user equipment and an available capacity associated with the network. In this regard, resource utilization of each FWI user equipment can be calculated (e.g., by the resource utilization component 404) by dividing the traffic by its sum of throughputs calculated in the coverage analysis stage. Summing up all resource utilization from all covered FWI user equipment can yield total resource utilization for the FWI service. If spectrum is shared by both FWI and mobility user equipment, the mobility resource utilization from the existing network can be added to the FWI utilization.

According to an embodiment, in response to a determination (e.g., by the resource utilization component 404) that the estimated resource utilization associated with the user equipment does not exceed the available capacity associated with the network, the system 402 can generate information (e.g., second information) that identifies the user equipment as operable with the network. It is noted that generating the second information that identifies the group of user equipment as operable with the network can comprise generating the second information in further response to the group of user equipment being determined not to exceed the available capacity of the network (e.g., by the resource utilization component 404).

Figure 5:
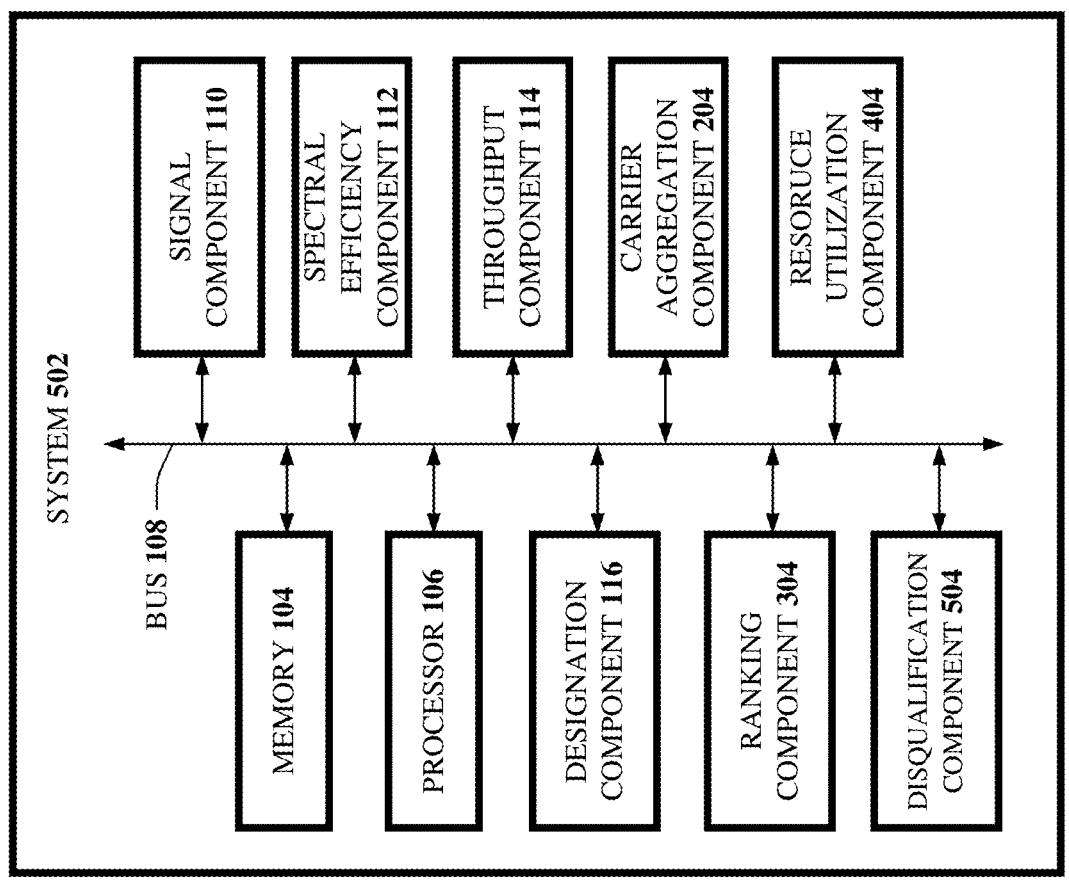
FIG. 5 is a block diagram of an exemplary system in accordance with one or more embodiments described herein.

Turning now to FIG. 5, there is illustrated an example, non-limiting system 502 in accordance with one or more embodiments herein. System 502 can comprise a computerized tool, which can be configured to perform various operations relating to FWI planning. The system 502 can be similar to system 402, and can comprise one or more of a variety of components, such as memory 104, processor 106, bus 108, signal component 110, spectral efficiency component 112, throughput component 114, designation component 116, carrier aggregation component 204, ranking component 304, and/or resource utilization component 404. The system 502 can additionally comprise a disqualification component 504.

In various embodiments, one or more of the memory 104, processor 106, bus 108, signal component 110, spectral efficiency component 112, throughput component 114, designation component 116, carrier aggregation component 204, ranking component 304, resource utilization component 404, and/or disqualification component 504 can be communicatively or operably coupled (e.g., over a bus or wireless network) to one another to perform one or more functions of the system 502.

Capacity Analysis:

According to an embodiment, the disqualification component 504 can, in response to data flows of a quantity of user equipment of the group of user equipment being determined to exceed a threshold capacity of the network, disqualify at least one of the group of user equipment in an order of increasing respective rank until the threshold capacity of the network is no longer exceeded. In this regard, the first user equipment can be disqualified before the second user equipment.

According to an embodiment, the designation component 116 can, in response to a quantity of user equipment of the group of user equipment being determined not to exceed a threshold capacity of the network, further categorize the user equipment as satisfying a capacity requirement associated with the network. In this regard, the quantity of user equipment comprises the user equipment.

According to an embodiment, in response to a quantity of user equipment of the group of user equipment being determined to exceed the available capacity of the network, the disqualification component 504 can disqualify at least one of the group of user equipment in a ranked order until the available capacity of the network is no longer exceeded.

Figure 6:
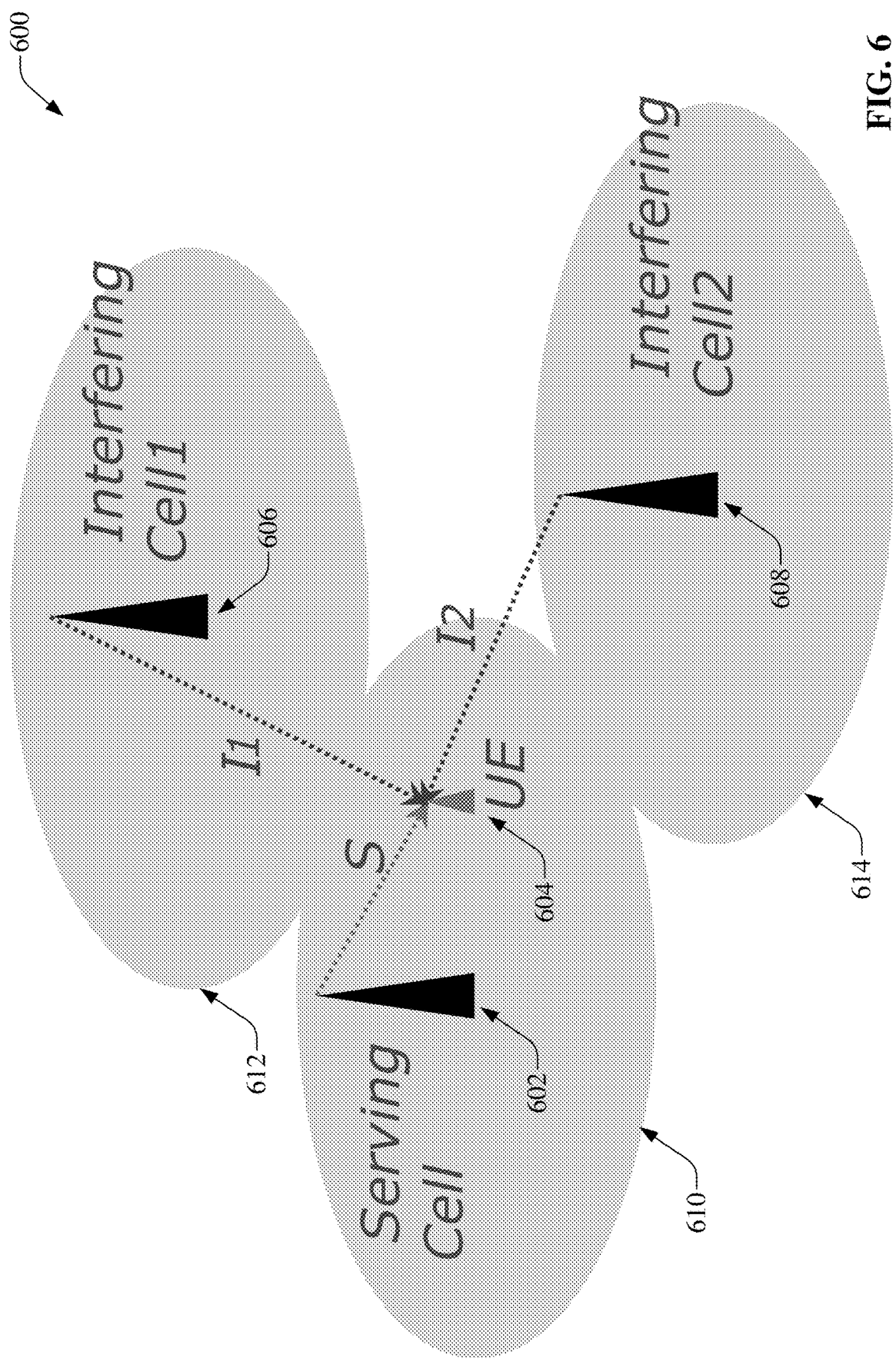
FIG. 6 is a diagram of exemplary fixed wireless internet (FWI) and surrounding cells in accordance with one or more embodiments described herein.

With reference to FIG. 6, there is illustrated a diagram 600 of exemplary FWI and surrounding cells in accordance with one or more embodiments described herein. In this regard, a serving cell 602 can serve user equipment 604. The serving cell 602 and/or user equipment 604 can be surrounded by two interfering cells (e.g., interfering cell 606 and interfering cell 608). Thus, it can be beneficial to calculate SINR value(s). In this regard, the serving cell 602 can generate coverage area 610, the interfering cell 606 can generate the coverage area 612, and the interfering cell 608 can generate coverage area 614.

There are generally minimum speed requirements for FWI services. For example, an FWI service should be able to provide download speed of at least X Mbps (e.g., 100 Mbps) and the upload speed of at least Y Mbps (e.g., 10 Mbps). Instead of using conventional signal strength metric, like RSRP values to determine if a given user is "covered" by the network, required speed metrics can be utilized directly in order to determine coverage.

An SINR value depends not only on a serving cell's RSRP, but also the RSRP values from neighboring cells, as well as the system loading of these cells. The system loading is generally reflected from the resource utilization of the cell.

It is noted that a coverage area can be divided into small bins or geographical areas (e.g., 25 m×25 m squares, though other suitable shapes/sizes can be utilized). Each candidate FWI user equipment location can be identified by the bin id. For each cell in the network, the cell-to-bin pair relation can be established.

Each cell's configuration information (e.g., band, bandwidth, transmission power, antenna settings, and access technology such as LTE, 5G, or 6G, and other suitable configuration information) can be determined. The topology of the network can also be determined, including the location of the cell sites, sectorization, antenna height, and other suitable topology information. The radio propagation from a given cell to a bin can be determined based on empirical propagation models, or specific software tools, or real measurements/surveys. Capabilities of the network and user equipment can be determined, including a device's maximum transmit power, antenna settings, supporting bands, carrier aggregation capabilities, and other suitable information. The existing mobility network's status can be determined, including the resource utilization, uplink interference, and other suitable information.

Figure 7:
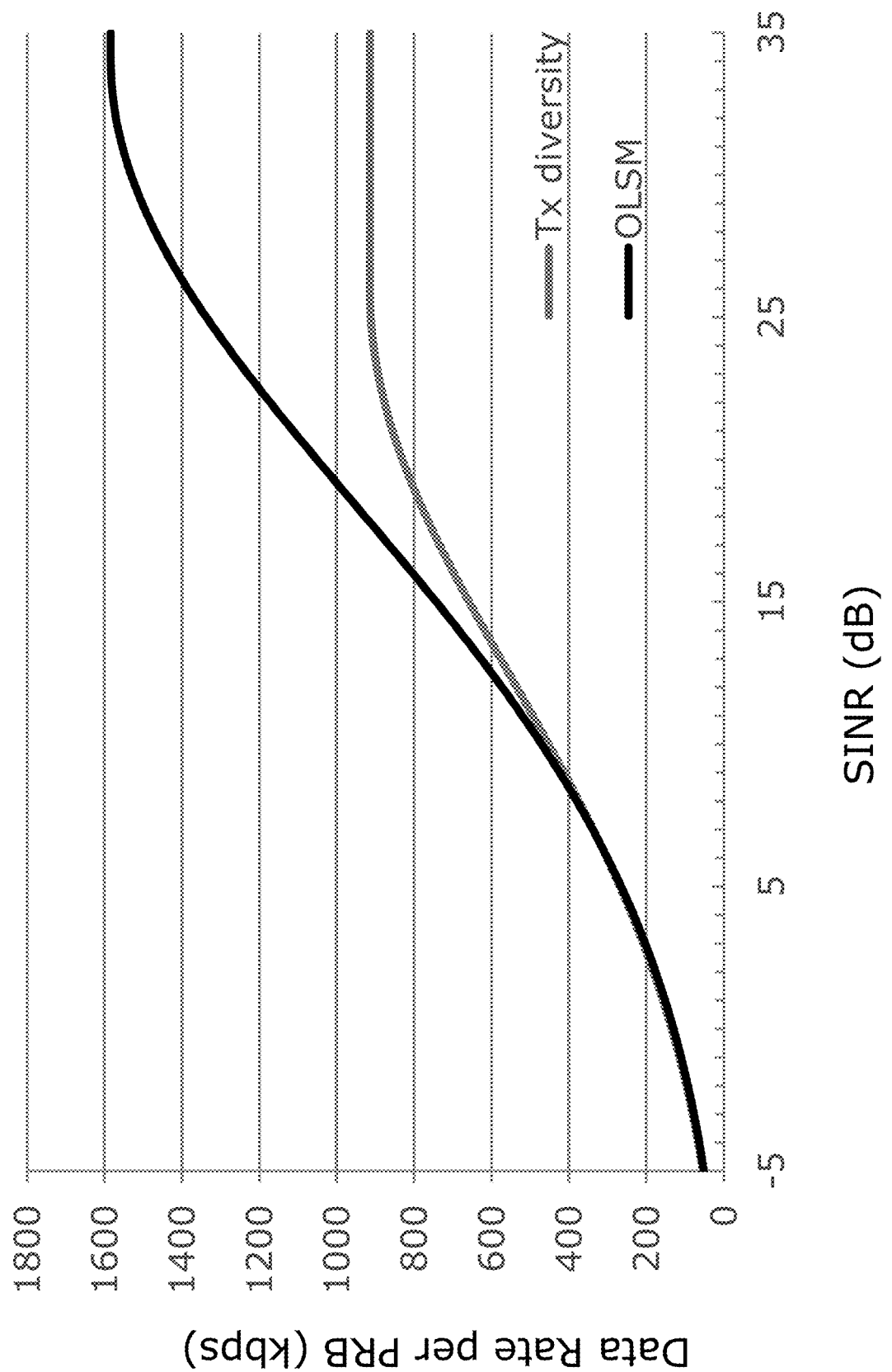
FIG. 7 is a diagram of exemplary signal-to-interference-plus-noise ratio (SINR) to efficiency mapping curves in accordance with one or more embodiments described herein.

FIG. 7 depicts a nonlimiting diagram of exemplary SINR to efficiency mapping curves in accordance with one or more embodiments described herein. In this regard, calculated SINR values can be converted to spectral efficiency using empirical mapping curves/tables. It is noted that such spectral efficiencies can account for MIMO schemes. In FIG. 7, two SINR-to-efficiency mapping curves are shown for different downlink MIMO schemes: 2×2 transmit diversity (e.g., Tx diversity) and 2×2 open-loop spatial multiplexing (e.g., OLSM). The SINR and data rates can be per PRB level.

Figure 8:
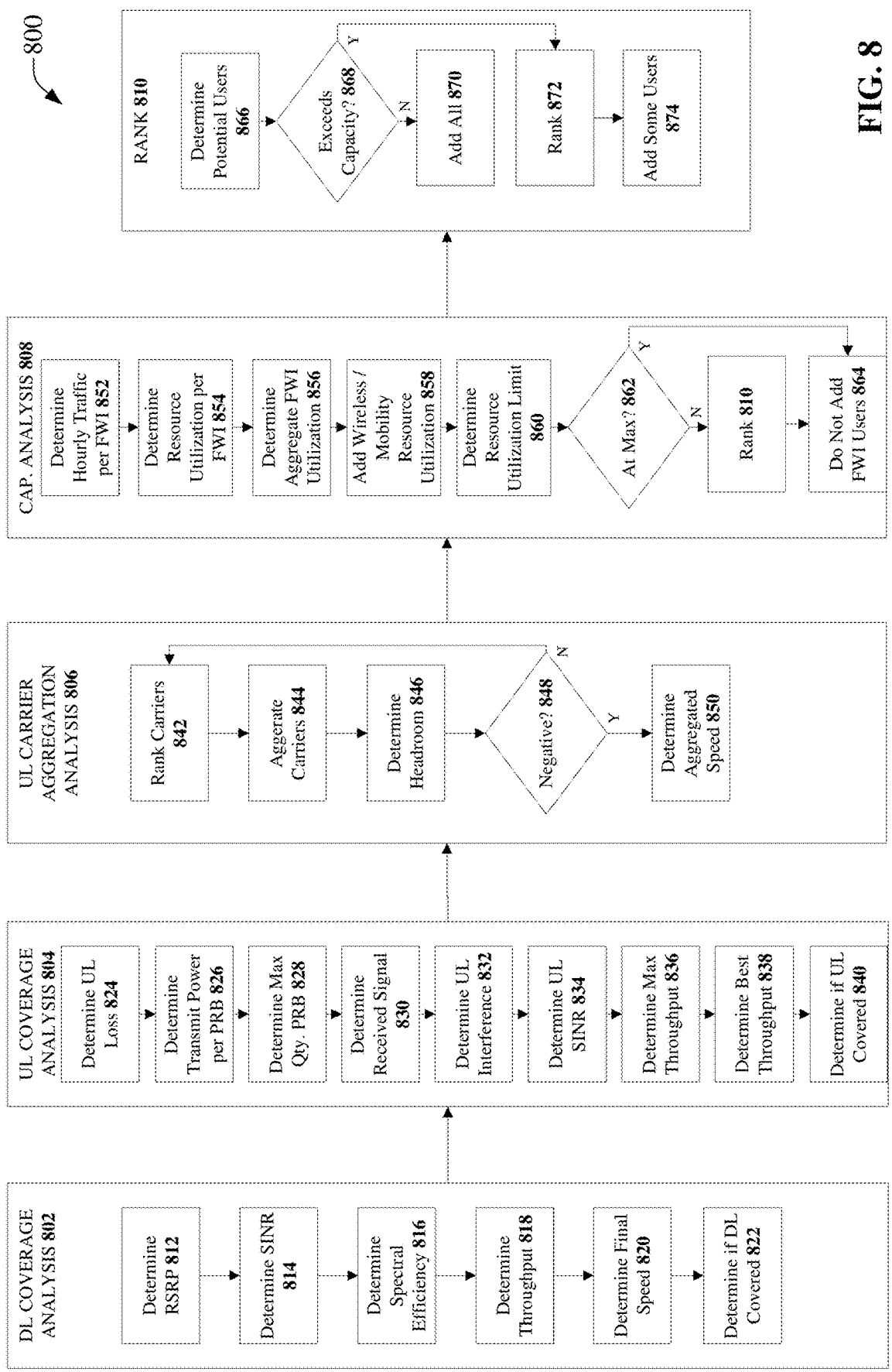
FIG. 8 is a flowchart for a process associated with FWI planning in accordance with one or more embodiments described herein.

Turning now to FIG. 8, there is illustrated a flow chart of a process 800 relating to fixed wireless internet planning in accordance with one or more embodiments described herein. At 802, downlink coverage analysis can be performed. In this regard, for each bin, the RSRP value can be calculated from each cell. Additionally, the serving cell can be determined based on best RSRP. See, e.g., Equation (1). At 814, for each bin in the serving cell, the process 800 can comprise calculating co-channel interference from neighboring cells and determining respective SINR values. See, e.g., Equation (2). At 816, the SINR values can be mapped to a spectral efficiency value based on MIMO settings, overhead assumptions, and/or other suitable factors. At 818, a user equipment's maximum throughput on a serving cell can be determined by scaling the efficiency with total available bandwidth. See, e.g., Equation (3). At 820, if carrier aggregation is permitted among a group of N cells, the throughput values on these N cells can be summed in order to determine final speed for respective user equipment. At 822, if this speed is higher than the required download speed of X Mbps, the respective user equipment can be determined to be downlink covered by the network.

At 804, uplink coverage analysis can be performed. In this regards, at 824, the UL LinkLoss from the user equipment to the serving cell can be determined. In this regard, Link-Loss can be determined according to the following:

$$Linkloss_{Ul} = LinkLoss_{DL} + 20*\log 10 \left( \frac{Freq_{Ul}}{Freq_{Dl}} \right) \quad \text{Equation (9)}$$

At 826, based on the pathloss and the uplink power control parameters (e.g., P0 and alpha), the transmit power per PRB can be determined. In this regard, transmit power can be determined according to the following:

$$P_{tx_{UL}} = \min(P_{max}, P0 + alpha*LinkLoss) \quad \text{Equation (10)}$$

In this regard:
P_max can be the maximal transmit power for the UE (e.g., generally apx. 23 dBm); and
P0 and alpha can be parameters set by the network for uplink power control.

At 828, based on the maximum transmit power of the user equipment the maximum number of PRBs that can be used for UL transmission can be determined. See, e.g., Equation (4). At 830, the received signal at the base station can be determined, for instance, based on the transmit power and pathloss. In this regard, the received uplink signal can be determined according to the following:

$$P_{rx_{UL}} = P_{tx_{UL}} - LinkLoss_{UL} \quad \text{Equation (11)}$$

At 832, the UL interference at the base station can be obtained, for instance, from measurement statistics or determined from models. In this regard, UL interference at a base station can be determined from key performance indicator (KPI) counters. At 834, the UL SINR value can then be determined from the received signal and the interference. The spectral efficiency values can then be determined from the SINR value. In this regard, an UL SINR to efficiency mapping curve can be applied to determine uplink spectral efficiency. At 836, the maximum throughput of the FWI user equipment can be calculated by scaling the efficiency with maximum number of PRBs obtained in Step 828 for each cell. See, e.g., Equation (5). At 838, the best throughput among all cells is the final UL speed for the user equipment (carrier aggregation is not assumed at this point). See, e.g., Equation (6). At 840, if the speed is larger than the required upload speed Y Mbps, the user equipment can be determined to be uplink covered by the network.

At 806, uplink carrier aggregation analysis can be performed. In this regard, at 842, for each user equipment, the carriers can be ranked, for instance, according to Equation (8). The carrier with the largest r-value can be evaluated first in order to determine if the power headroom is larger than zero. If the power headroom is not larger than zero, the carrier aggregation is not permitted. If the power headroom is larger than zero, the carrier with second largest r-value can be selected. The maximum number of PRBs that can be used for UL transmission is determined. It is noted that the available power for UL transmission can be the remaining power from the first carrier. At 844, The maximum UL speed on the second carrier can be determined and aggregated to the first carrier's speed. At 848, if the power headroom is not negative, the process can return to 842. If at 848, the power headroom is negative, aggregated speed can be determined at 850. This process at 848 can continue until the power headroom becomes negative, or the maximum number of carriers for UL carrier aggregation is reached. The final aggregated speed can represent the user equipment maximum UL speed.

At 808, capacity analysis can be performed. In this regard, at 852, hourly traffic for each FWI can predefined. In other embodiments, hourly traffic for each FWI can be determined, for instance, by analyzing the statistics of the existing cable user equipment. For capacity analysis, busy network statistics are generally utilized (e.g., peak-use times). At 854, resource utilization of each FWI user equipment can be determined by dividing the traffic by its sum of throughputs determined, for instance, in the coverage analysis stage(s). At 856, all the resource utilization from all covered FWI user equipment can be summed, which can yield total resource utilization for the FWI service. At 858, if the spectrum is shared by both FWI and mobility/wireless user equipment, the mobility resource utilization from the existing network can be added to the FWI utilization. At 860, a resource utilization limit can be determined. Capacity planning can be intended to guarantee that the total resource utilization does not exceed a defined limit, such that the average user performance is not significantly impacted. If there is an additional requirement that the added FWI user equipment should not degrade the average mobility user equipment throughput below Z Mbps, the upper limit for the resource utilization can be derived from queueing theory as follows:

Q_max=1−Z/C, where C is the capacity of the mobility/wireless user equipment which can be obtained from network counters. If there is not a throughput requirement for mobility/wireless users, Q_max can be any pre-defined threshold. In this regard, FWI user equipment can be added until the total resource utilization reaches Q_max. Further in this regard, if at 862, resource utilization is already at a limit, FWI user equipment is not added at 864. If at 862, resource utilization is not already at a limit, the process 800 can proceed to ranking at 810. At 810, ranking can be performed. In this regard, at 866, potential FWI user equipment can be determined. If a quantity of potential FWI user equipment in the covered area exceeds the available capacity of the network, either some FWI user equipment will need to be disqualified in order to avoid network congestion, or the network capacity should be augmented to accommodate more user equipment (e.g., add additional carrier/spectrum). At 868, if adding all of the FWI user equipment would not exceed network capacity, all FWI user equipment can be added at 870. If at 868, the potential FWI user equipment would exceed network capacity, the FWI user equipment can each be ranked at 872. Based on previous coverage determinations, the FWI user equipment can be ranked (e.g., by their respective maximum speeds). Therefore, at 874, according to capacity analyses, FWI user equipment can be added (e.g., one-by-one) based on the descending order of respective speeds. Otherwise, new capacities can be added to the system (e.g., adding a new carrier), and the coverage and capacity analysis in the previous steps can be performed again to include newly added capacities in the overall capacity.

Figure 9:
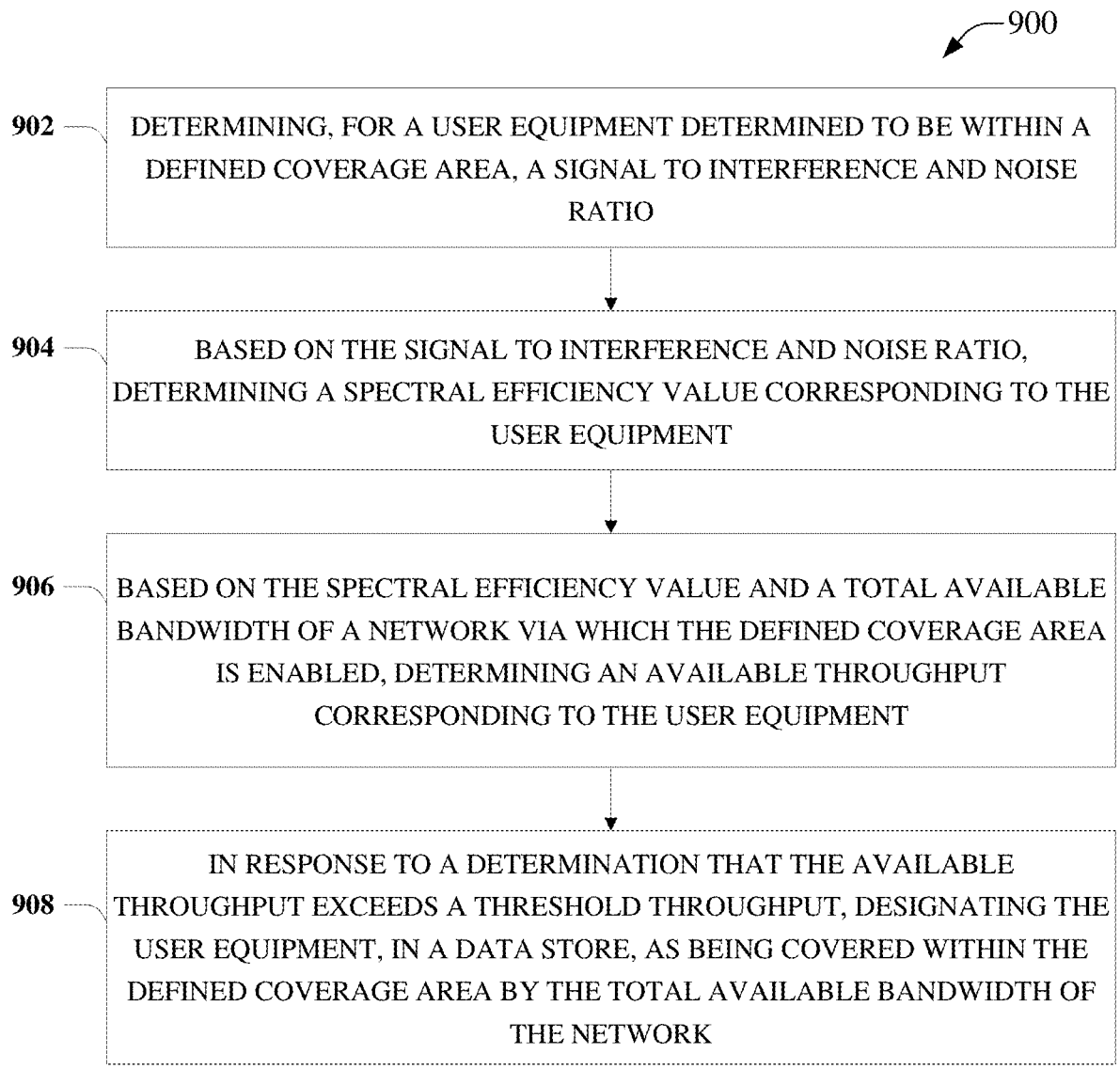
FIG. 9 is a block flow diagram for a process associated with FWI planning in accordance with one or more embodiments described herein.

FIG. 9 illustrates a block flow diagram for a process 900 associated with FWI planning in accordance with one or more embodiments described herein. At 902, the process 900 can comprise determining (e.g., using a signal component 110), for a user equipment determined to be within a defined coverage area, a signal to interference and noise ratio. At 904, the process 900 can comprise based on the signal to interference and noise ratio, determining (e.g., using the spectral efficiency component 112) a spectral efficiency value corresponding to the user equipment. At 906, the process 900 can comprise, based on the spectral efficiency value and a total available bandwidth of a network via which the defined coverage area is enabled, determining (e.g., using the throughput component 114) an available throughput corresponding to the user equipment. At 908, the process 900 can comprise in response to a determination that the available throughput exceeds a threshold throughput, designating (e.g., using the designation component 116) the user equipment, in a data store, as being covered within the defined coverage area by the total available bandwidth of the network.

Figure 10:
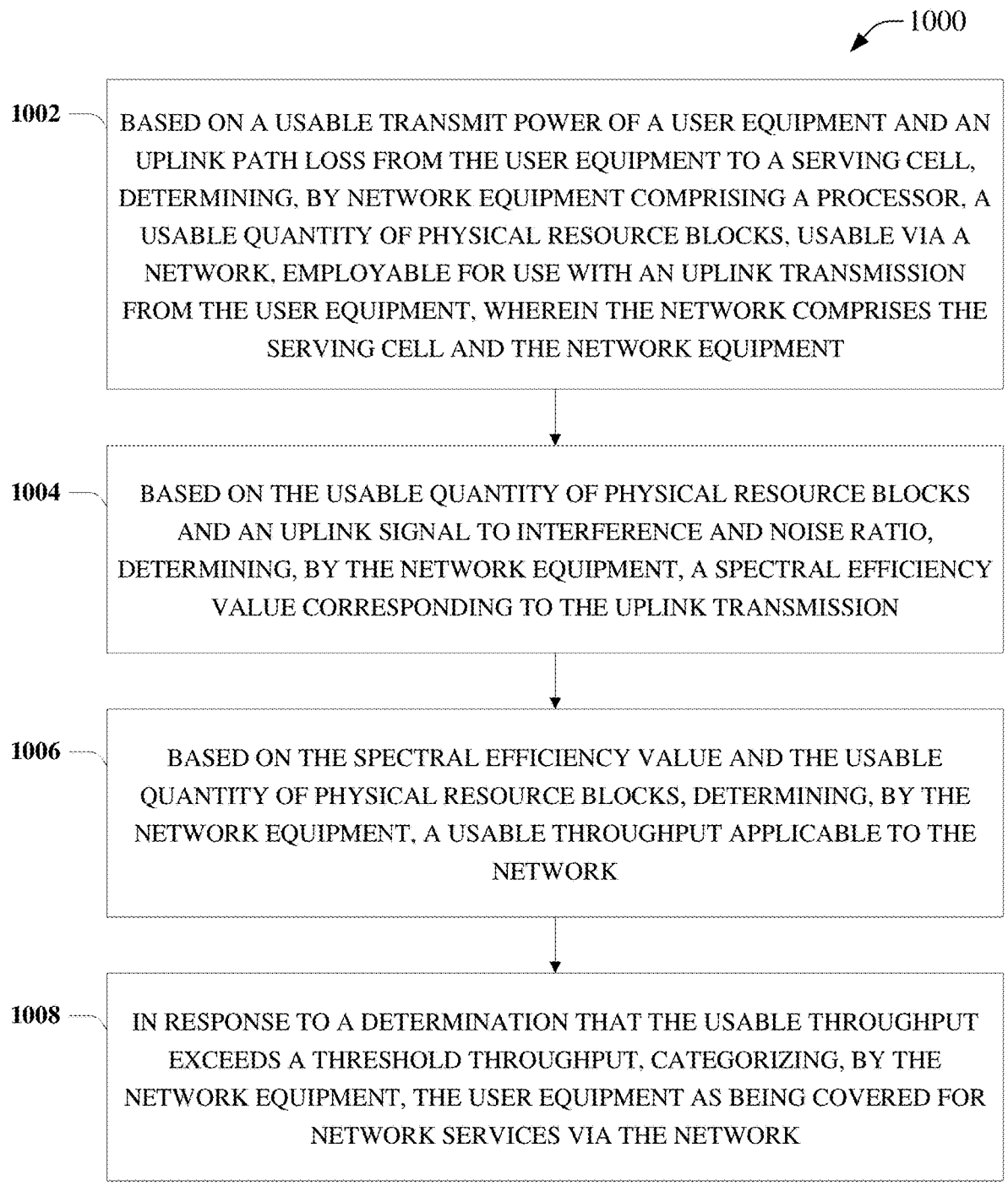
FIG. 10 is a block flow diagram for a process associated with FWI planning in accordance with one or more embodiments described herein.

FIG. 10 illustrates a block flow diagram for a process 1000 associated with FWI planning in accordance with one or more embodiments described herein. At 1002, the process 1000 can comprise based on a usable transmit power of a user equipment and an uplink path loss from the user equipment to a serving cell, determining, by network equipment comprising a processor (e.g., using the signal component 110), a usable quantity of physical resource blocks, usable via a network, employable for use with an uplink transmission from the user equipment, wherein the network comprises the serving cell and the network equipment. At 1004, the process 1000 can comprise based on the usable quantity of physical resource blocks and an uplink signal to interference and noise ratio, determining, by the network equipment (e.g., using the spectral efficiency component 112), a spectral efficiency value corresponding to the uplink transmission. At 1006, the process 1000 can comprise based on the spectral efficiency value and the usable quantity of physical resource blocks, determining, by the network equipment (e.g., using the throughput component 114), a usable throughput applicable to the network. At 1008, the process 1000 can comprise in response to a determination that the usable throughput exceeds a threshold throughput, categorizing, by the network equipment (e.g., using the designation component 116), the user equipment as being covered for network services via the network.

Figure 11:
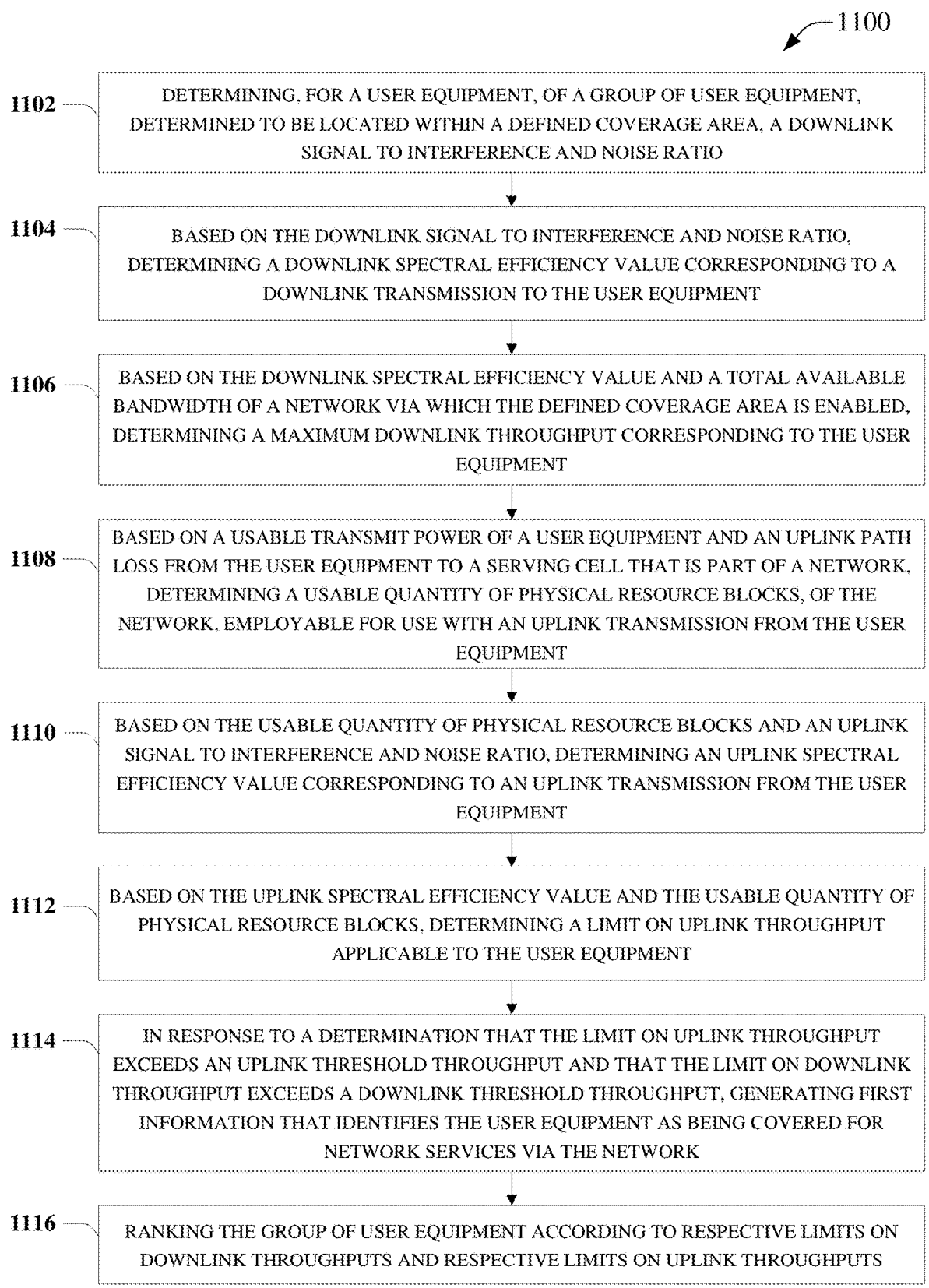
FIG. 11 is a block flow diagram for a process associated with FWI planning in accordance with one or more embodiments described herein.

FIG. 11 illustrates a block flow diagram for a process 1100 associated with FWI planning in accordance with one or more embodiments described herein. At 1102, the process 1100 can comprise determining (e.g., using a signal component 110), for a user equipment, of a group of user equipment, determined to be located within a defined coverage area, a downlink signal to interference and noise ratio. At 1104, the process 1100 can comprise based on the downlink signal to interference and noise ratio, determining (e.g., using the spectral efficiency component 112) a downlink spectral efficiency value corresponding to a downlink transmission to the user equipment. At 1106, the process 1100 can comprise based on the downlink spectral efficiency value and a total available bandwidth of a network via which the defined coverage area is enabled, determining (e.g., using the throughput component 114) a maximum downlink throughput corresponding to the user equipment. At 1108, the process 1100 can comprise based on a usable transmit power of a user equipment and an uplink path loss from the user equipment to a serving cell that is part of a network, determining (e.g., the signal component 110) a usable quantity of physical resource blocks, of the network, employable for use with an uplink transmission from the user equipment. At 1110, the process 1100 can comprise based on the usable quantity of physical resource blocks and an uplink signal to interference and noise ratio, determining (e.g., using the spectral efficiency component 112) an uplink spectral efficiency value corresponding to an uplink transmission from the user equipment. At 1112, the process 1100 can comprise based on the uplink spectral efficiency value and the usable quantity of physical resource blocks, determining (e.g., using the throughput component 114) a limit on uplink throughput applicable to the user equipment. At 1114, the process 1100 can comprise in response to a determination that the limit on uplink throughput exceeds an uplink threshold throughput and that the limit on downlink throughput exceeds a downlink threshold throughput, generating (e.g., using the designation component 116) first information that identifies the user equipment as being covered for network services via the network. At 1116, the process 1100 can comprise ranking (e.g., using the ranking component 304) the group of user equipment according to respective limits on downlink throughputs and respective limits on uplink throughputs.

Figure 12:
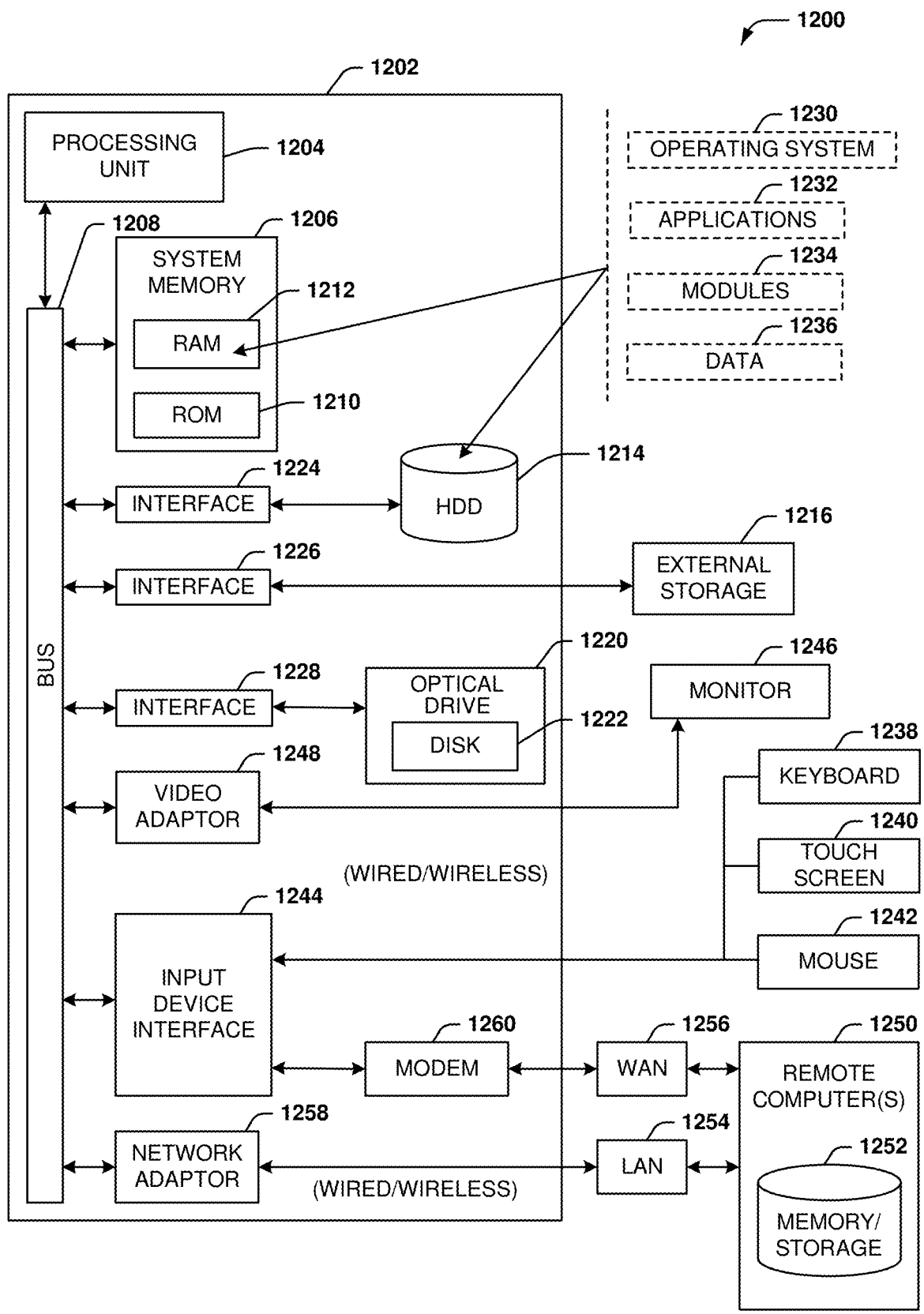
FIG. 12 is an example, non-limiting computing environment in which one or more embodiments described herein can be implemented.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
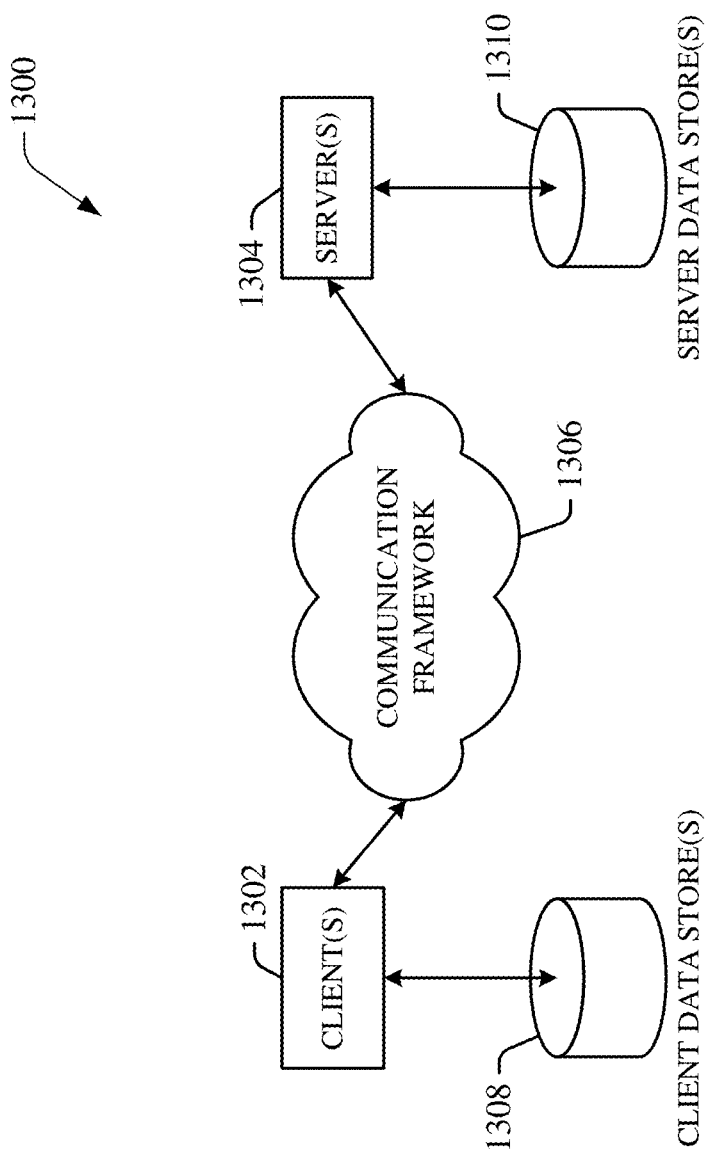
FIG. 13 is an example, non-limiting networking environment in which one or more embodiments described herein can be implemented.

Referring now to FIG. 13, there is illustrated a schematic block diagram of a computing environment 1300 in accordance with this specification. The system 1300 includes one or more client(s) 1302, (e.g., computers, smart phones, tablets, cameras, PDA's). The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware or hardware in combination with software (e.g., threads, processes, computing devices). The servers 1304 can house threads to perform transformations of media items by employing aspects of this disclosure, for example. One possible communication between a client 1302 and a server 1304 can be in the form of a data packet adapted to be transmitted between two or more computer processes wherein data packets may include coded analyzed headspaces and/or input. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

In one exemplary implementation, a client 1302 can transfer an encoded file, (e.g., encoded media item), to server 1304. Server 1304 can store the file, decode the file, or transmit the file to another client 1302. It is noted that a client 1302 can also transfer uncompressed file to a server 1304 and server 1304 can compress the file and/or transform the file in accordance with this disclosure. Likewise, server 1304 can encode information and transmit the information via communication framework 1306 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   determining, for a user equipment determined to be within a defined coverage area, a signal to interference and noise ratio;
   based on the signal to interference and noise ratio, determining a spectral efficiency value corresponding to the user equipment;
   based on the spectral efficiency value and a usable quantity of physical resource blocks, determining an available throughput corresponding to the user equipment; and
   in response to a determination that the available throughput exceeds a threshold throughput, designating the user equipment, in a data store, as being covered for network services of a network via which the defined coverage area is enabled.

2. The system of claim 1, wherein the operations further comprise:
   determining carrier aggregation information representative of a compatibility of carrier aggregation for a pairing of the user equipment and a serving cell of the defined coverage area, wherein determining the available throughput is further based on the carrier aggregation information.

3. The system of claim 1, wherein determining the signal to interference and noise ratio comprises determining a reference signal received power associated with the user equipment and the defined coverage area.

4. The system of claim 1, wherein the user equipment is a first user equipment and the available throughput comprises a first maximum throughput, and wherein the operations further comprise:
   ranking a group of user equipment according to respective maximum throughputs, wherein the group of user equipment comprises the first user equipment; and
   in response to a determination that a second user equipment of the group of user equipment comprises a second maximum throughput, larger than the first maximum throughput, designating the second user equipment as comprising a higher rank than the first user equipment.

5. The system of claim 4, wherein the operations further comprise:
   in response to estimated data traffic of a quantity of user equipment of the group of user equipment being determined to exceed a threshold capacity of the network, disqualifying at least one of the group of user equipment in an order of increasing rank until the threshold capacity of the network is no longer exceeded, and wherein the first user equipment is disqualified before the second user equipment.

6. The system of claim 4, wherein the operations further comprise:
   in response to estimated data traffic associated with the user equipment being determined not to exceed a threshold capacity of the network, further designating, in the data store, the user equipment as satisfying a capacity requirement associated with the network.

7. The system of claim 1, wherein the spectral efficiency value is further determined based on a multiple-input and multiple-output configuration setting of the network.

8. The system of claim 1, wherein the user equipment comprises fixed wireless internet user equipment.

9. A method, comprising:
based on a usable transmit power of a user equipment and an uplink path loss from the user equipment to a serving cell, determining, by network equipment comprising a processor, a usable quantity of physical resource blocks, usable via a network, employable for use with an uplink transmission from the user equipment, wherein the network comprises the serving cell and the network equipment;
based on the usable quantity of physical resource blocks and an uplink signal to interference and noise ratio, determining, by the network equipment, a spectral efficiency value corresponding to the uplink transmission;
based on the spectral efficiency value and the usable quantity of physical resource blocks, determining, by the network equipment, a usable throughput applicable to the network; and
in response to a determination that the usable throughput exceeds a threshold throughput, categorizing, by the network equipment, the user equipment as being covered for network services via the network.

10. The method of claim 9, further comprising:
determining, by the network equipment, carrier aggregation information representative of a compatibility of carrier aggregation for a pairing of the user equipment and the serving cell of the network, wherein determining the usable throughput is further based on the carrier aggregation information.

11. The method of claim 9, wherein the user equipment is a first user equipment and the usable throughput comprises a first maximum throughput, and wherein the method further comprises:
ranking, by the network equipment, a group of user equipment according to respective maximum throughputs, wherein the group of user equipment comprises the first user equipment, the ranking comprising, in response to a determination that a second user equipment of the group of user equipment comprises a second maximum throughput, larger than the first maximum throughput, categorizing the second user equipment as comprising a higher rank than the first user equipment.

12. The method of claim 11, further comprising:
in response to data flows of a quantity of user equipment of the group of user equipment being determined, by the network equipment, to exceed a threshold capacity of the network, disqualifying, by the network equipment, at least one of the group of user equipment in an order of increasing respective rank until the threshold capacity of the network is no longer exceeded, wherein the first user equipment is disqualified before the second user equipment.

13. The method of claim 11, further comprising:
in response to a quantity of user equipment of the group of user equipment being determined not to exceed a threshold capacity of the network, further categorizing, by the network equipment, the user equipment as satisfying a capacity requirement associated with the network, wherein the quantity of user equipment comprises the user equipment.

14. The method of claim 9, wherein the user equipment comprises fixed wireless user equipment.

15. The method of claim 14, wherein the fixed wireless user equipment are assigned to be of a lower priority, of respective equipment priorities, than mobile wireless user equipment communicatively coupled to the network.

16. A non-transitory machine-readable medium, comprising executable instructions that, when executed by a processor, facilitate performance of operations, comprising:
determining, for a user equipment, of a group of user equipment, determined to be located within a defined coverage area, a downlink signal to interference and noise ratio;
based on the downlink signal to interference and noise ratio, determining a downlink spectral efficiency value corresponding to a downlink transmission to the user equipment;
based on the downlink spectral efficiency value and a total available bandwidth of a network via which the defined coverage area is enabled, determining a maximum downlink throughput corresponding to the user equipment;
based on a usable transmit power of a user equipment and an uplink path loss from the user equipment to a serving cell that is part of a network, determining a usable quantity of physical resource blocks, of the network, employable for use with an uplink transmission from the user equipment;
based on the usable quantity of physical resource blocks and an uplink signal to interference and noise ratio, determining an uplink spectral efficiency value corresponding to an uplink transmission from the user equipment;
based on the uplink spectral efficiency value and the usable quantity of physical resource blocks, determining a limit on uplink throughput applicable to the user equipment;
in response to a determination that the limit on uplink throughput exceeds an uplink threshold throughput and that the limit on downlink throughput exceeds a downlink threshold throughput, generating first information that identifies the user equipment as being covered for network services via the network; and
ranking the group of user equipment according to respective limits on downlink throughputs and respective limits on uplink throughputs.

17. The non-transitory machine-readable medium of claim 16, wherein the operations further comprise:
determining an estimated resource utilization associated with the user equipment and an available capacity associated with the network; and
in response to a determination that the estimated resource utilization associated with the user equipment does not exceed the available capacity associated with the network, generating second information that identifies the user equipment as operable with the network.

18. The non-transitory machine-readable medium of claim 17, wherein the operations further comprise:
in response to a quantity of user equipment of the group of user equipment being determined to exceed the available capacity of the network, disqualifying at least one of the group of user equipment in a ranked order until the available capacity of the network is no longer exceeded.

19. The non-transitory machine-readable medium of claim 17, wherein generating the second information that identifies the group of user equipment as operable with the network comprises generating the second information in further response to the group of user equipment being determined not to exceed the available capacity of the network.

20. The non-transitory machine-readable medium of claim 16, wherein the group of user equipment comprises fixed wireless user equipment and mobile wireless user equipment.

\* \* \* \* \*